March 1, 1949.  C. P. DEIBEL  2,463,089
FLAT DRY CELL BATTERY UNIT
Filed March 14, 1945
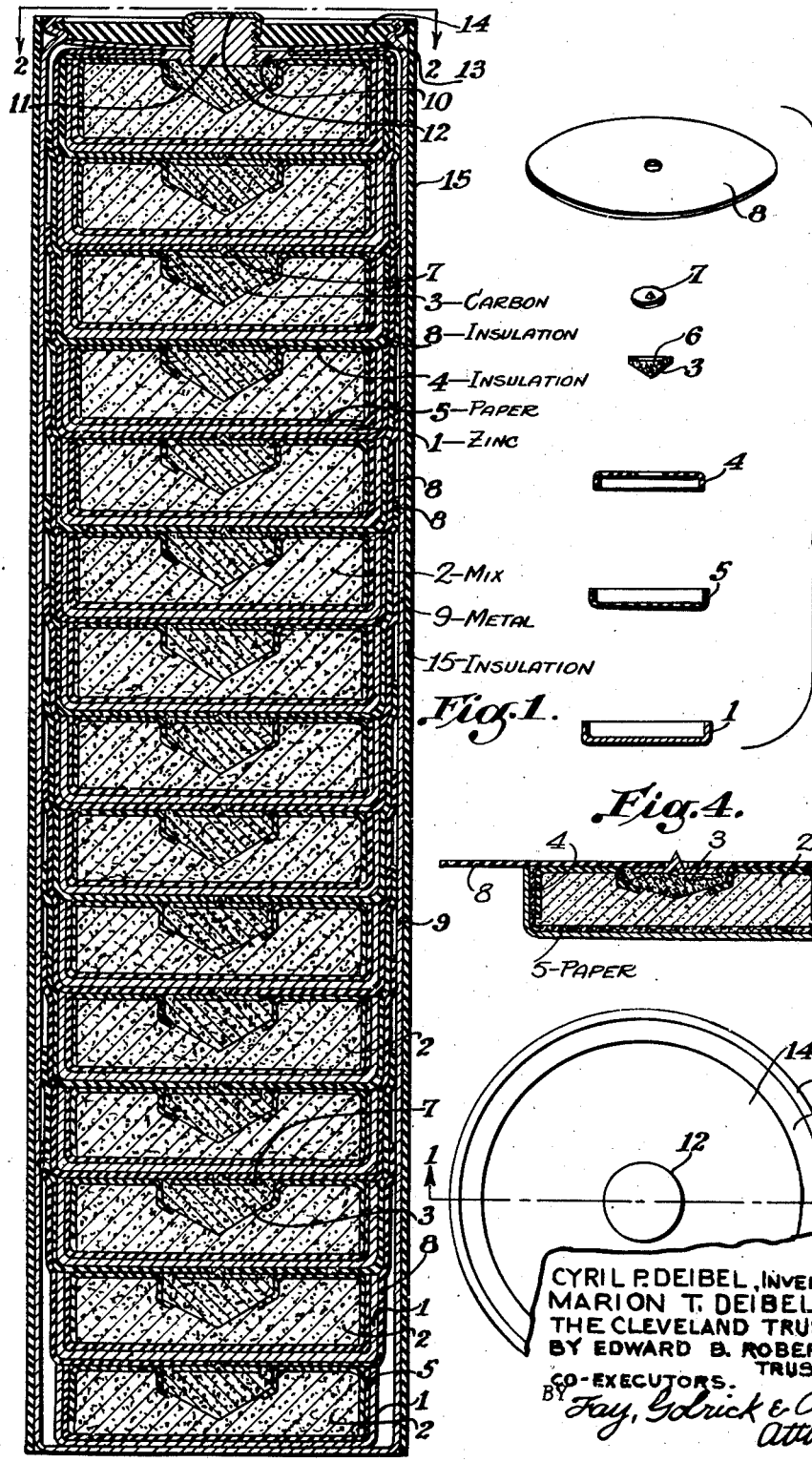
CYRIL P. DEIBEL, INVENTOR DECEASED
MARION T. DEIBEL,
THE CLEVELAND TRUST COMPANY,
BY EDWARD B. ROBERTS,
  TRUST OFFICER,
CO-EXECUTORS.
BY Fay, Golrick & Chilton.
  Attorneys.

Patented Mar. 1, 1949

2,463,089

UNITED STATES PATENT OFFICE 2,463,089

FLAT DRY CELL BATTERY UNIT

Cyril P. Deibel, deceased, late of Lakewood, Ohio, by Marion T. Deibel, Lakewood, and the Cleveland Trust Company, Cleveland, Ohio, coexecutors, assignors to General Dry Batteries, Inc., a corporation of Ohio Application March 14, 1945, Serial No. 582,601

4 Claims. (Cl. 136—111)

This invention relates to a dry cell battery unit which is made up of a plurality of separate individual dry cells which are sealed within an outer casing in such a manner that the likelihood of leakage of electrolyte is reduced to a minimum, the several cells being individually closed and sealed and connected in series in stacked relation, the entire group of cells being enclosed within an outer casing which is effectively sealed by a mass of suitable sealing material.

One of the objects of the invention is to provide a dry cell battery of the character described which is made up of a plurality of dry cells which are arranged within an outer casing in stacked relation and held in series connection under pressure, each cell comprising a negative electrode containing a mass of depolarizing mix and a positive electrode. A thin sheet of insulating material is disposed over the top of each cell but permitting series connection between adjacent cells, this sheet of insulating material being of such size as to extend upwardly along the side of the next adjacent cell, the upper end of the outer casing being deflected inwardly to hold the cells in intimate contact under pressure.

Further and more limited objects of the invention will appear as the description proceeds and by reference to the accompanying drawings in which Fig. 1 is a vertical sectional view of the battery;

Fig. 2 is a top plan view on the line 2—2 of Fig. 1;

Fig. 3 is a disassembled view disclosing the several parts which make up each individual cell; and Fig. 4 is a sectional view of one of the cells before assembly into the battery.

Referring now to the drawings, each individual cell preferably comprises a zinc cup 1 which contains a mass of mix 2 and a carbon electrode 3. The mass of mix is separated from the zinc cup by a pair of oppositely disposed thin layers of material indicated by the reference characters 4 and 5. It will be noted that these layers of material overlap the sides of the mass of mix. The lower layer of material is preferably formed of battery paper while the upper layer is preferably formed of a thin layer of insulating material such as Koroseal (vinyl chloride copolymer) or Pliofilm (rubber hydrochloride). Each carbon electrode 3 is embedded in the adjacent mass of mix and has a recess 6 in the upper face thereof which receives a resilient metal contact member 7. Disposed over the upper end of each cell is a thin disk of insulating material 8 which is preferably formed of Koroseal or Pliofilm. The contact member 7 projects through openings provided in the layers of insulating material 4 and 8. The layer of insulating material 4 is disposed between the periphery of the carbon electrode and the somewhat V-shaped depression in the mass of mix and is secured thereto by suitable adhesive material in liquid-tight relation. The disk of sealing material 8 is also preferably secured to the layer of insulating material 4 by a suitable liquid-proof adhesive.

In assembling the battery unit, a plurality of cells are inserted within an outer metal container 9, preferably formed of zinc, in the manner shown in Fig. 1. The lowermost cell has metal contact with the bottom of the outer casing 9. Each of the disks of insulating material 8 is of such size that it extends upwardly to a point adjacent the top of the next cell thereabove. The layer of insulating material 8 of the uppermost cell is bent over inwardly and disposed thereover is a metallic disk 10 having a threaded opening therein which receives a threaded terminal 11 to the upper end of which is secured a metal cap 12. Disposed over the metal disk 10 is a metal plate 13 which is slightly convexed or dished. The plate 13 does not contact the terminal 11. The metal casing 9 with the cells therein is then placed within a suitable fixture and the cells placed under compression with considerable pressure. With the cells held in this condition, the casing 9 is deflected inwardly adjacent the upper end thereof so as to hold the cells in place in electrical contact with each other. The flexed or convex disk 13 is somewhat resilient and tends to resiliently urge the cells into intimate electrical contact.

The upper end of the battery is closed by a mass of suitable sealing material 14 and the upper peripheral edge of the outer metal casing 9 is also deflected inwardly as shown in Fig. 1. The mass of sealing material interlocks with the inturned portions of the metal casing and serves to provide an effective seal for the battery. The assembled battery is placed within an outer insulating cover or jacket 15 which, if desired, may cover the bottom of the metal casing 9.

From the foregoing description, it will appear that each cell is separately and individually sealed from the adjacent cell and that the top layer of insulating material of each cell overlaps the layer of insulating material of an adjacent cell. Each layer of insulating material may, if desired, have a coating of film or oil applied thereto so as to provide a more effective seal.

The layers of Pliofilm or Koroseal preferably have a thickness of about .002 inch and therefore occupy very little space, thus permitting a large quantity of active material to be used. While the inventor preferred to use Koroseal or Pliofilm, it is of course to be understood that one may make use of any thin insulating material having the desirable qualities.

It will now be clear that the inventor has provided a dry cell battery unit which will accomplish the objects of the invention as hereinbefore stated. The particular size of the individual cells may be varied as the exigencies of the occasion may demand. Various other changes may also be made in the shape, size and arrangement of parts as well as in the specific materials used without departing from the spirit of the invention. It is therefore to be understood that the embodiment of the invention herein disclosed is to be considered merely as illustrative and not in a limiting sense as the invention is limited only in accordance with the scope of the appended claims.

Reference is hereby made to the copending application of Cyril P. Deibel, Clarence N. Mertes and Lewis A. Gray, Serial No. 495,150, filed July 17, 1943, now Patent No. 2,436,382 dated February 24, 1948, which is owned by the assignee of the present application.

Having thus described the invention, what is claimed is:

1. A dry cell battery unit comprising an outer casing, a plurality of dry cells arranged within said casing in stacked relation and held in series connection under pressure, each cell including a negative electrode and a mass of mix containing a positive electrode, a thin sheet of insulating material disposed over the top of each cell but having an opening permitting series connection between adjacent cells, each positive electrode having an exposed surface having electrical connection with the next adjacent negative electrode, means securing each of said sheets of insulating material to the adjacent positive electrode in liquid tight relation, each sheet of insulating material overlapping the next adjacent cell and extending upwardly along the sides thereof, and means cooperating with said outer casing to urge said cells into intimate contact with each other, each individual cell having a second thin layer of insulating material embracing the top and side of the mass of mix, said second layer also having an opening permitting series connection between adjacent cells, and a thin layer of battery paper embracing the bottom and side of the mass of mix.

2. A dry cell battery unit comprising an outer casing, a plurality of dry cells arranged in said casing in stacked relation and held in series connection under pressure, each cell comprising a cup-shaped zinc electrode having bottom and side walls and having a lining of battery paper, a mass of mix within the zinc electrode, and having a surface in contact with said lining adjacent the bottom of the zinc electrode, a carbon electrode embedded in the mass of mix and having its upper surface exposed, a thin sheet of insulating material extending over the top of the mass of mix and downwardly along the sides of the mass of mix between the mix and the lining of battery paper, said sheet having a central opening therein, the marginal portions of the insulating material adjacent said opening being disposed between said carbon electrode and said mass of mix, and a second thin sheet of insulating material overlying the first mentioned sheet of insulating material on the top of the mass of mix and overlapping the next adjacent cell of the battery, said second sheet extending over the upper surface of said carbon electrode and having a central opening over said carbon electrode, there being a metal contact member disposed between said second sheet and said carbon electrode, said contact member having a portion projecting through said opening in said second sheet and making contact with the zinc electrode of an adjacent cell.

3. A dry cell battery unit comprising an outer casing, a plurality of dry cells arranged in said casing in stacked relation and held in series connection under pressure, each cell comprising a cup-shaped zinc electrode having bottom and side walls and having a lining of battery paper, a mass of mix within the zinc electrode and having a surface in contact with said lining adjacent the bottom of the zinc electrode, a carbon electrode embedded in the mass of mix and having its upper surface exposed, and a thin sheet of insulating material extending over the top of the mass of mix and downwardly along the sides of the mass of mix between the mix and the lining of battery paper, said sheet having a central opening therein, the marginal portions of the insulating material adjacent said opening being disposed between said carbon electrode and said mass of mix.

4. A dry cell battery unit comprising an outer casing, a plurality of dry cells arranged within said casing in stacked relation and held in series connection under pressure, each cell comprising a cup-shaped zinc electrode having bottom and side walls and having a lining of battery paper, a mass of mix within the zinc electrode, a carbon electrode in contact with the mass of mix, a thin sheet of insulating material disposed over the top of the cell but having an opening through which said carbon electrode extends permitting series connection between adjacent cells, said sheet of insulating material being secured in liquid tight relation to said carbon electrode and the marginal edges of said sheet of insulating material being retained within said zinc electrode, a resilient metal contact member making contact between said carbon electrode and the zinc cup of the adjacent cell, and a second sheet of insulating material extending over the surface of said carbon electrode and having an opening over said carbon electrode through which said resilient metal contact member extends, said second sheet of insulating material retaining said contact member in place and extending beyond the edges of said zinc cup electrode.

MARION T. DEIBEL,
THE CLEVELAND TRUST COMPANY,
By EDWARD B. ROBERTS,
                                   *Trust Officer,*
*Coexecutors of the Estate of Cyril P. Deibel, Deceased.*

REFERENCES CITED

The following references are of record in the file of this patent:

UNITED STATES PATENTS

| Number | Name | Date |
| --- | --- | --- |
| 1,467,240 | Doe | Sept. 4, 1923 |
| 2,144,574 | MacCallum | Jan. 17, 1939 |
| 2,307,764 | Deibel et al. | Jan. 12, 1943 |
| 2,307,765 | Deibel | Jan. 12, 1943 |
| 2,307,766 | Deibel | Jan. 12, 1943 |
| 2,436,382 | Deibel et al. | Feb. 24, 1948 |